UNITED STATES PATENT OFFICE.

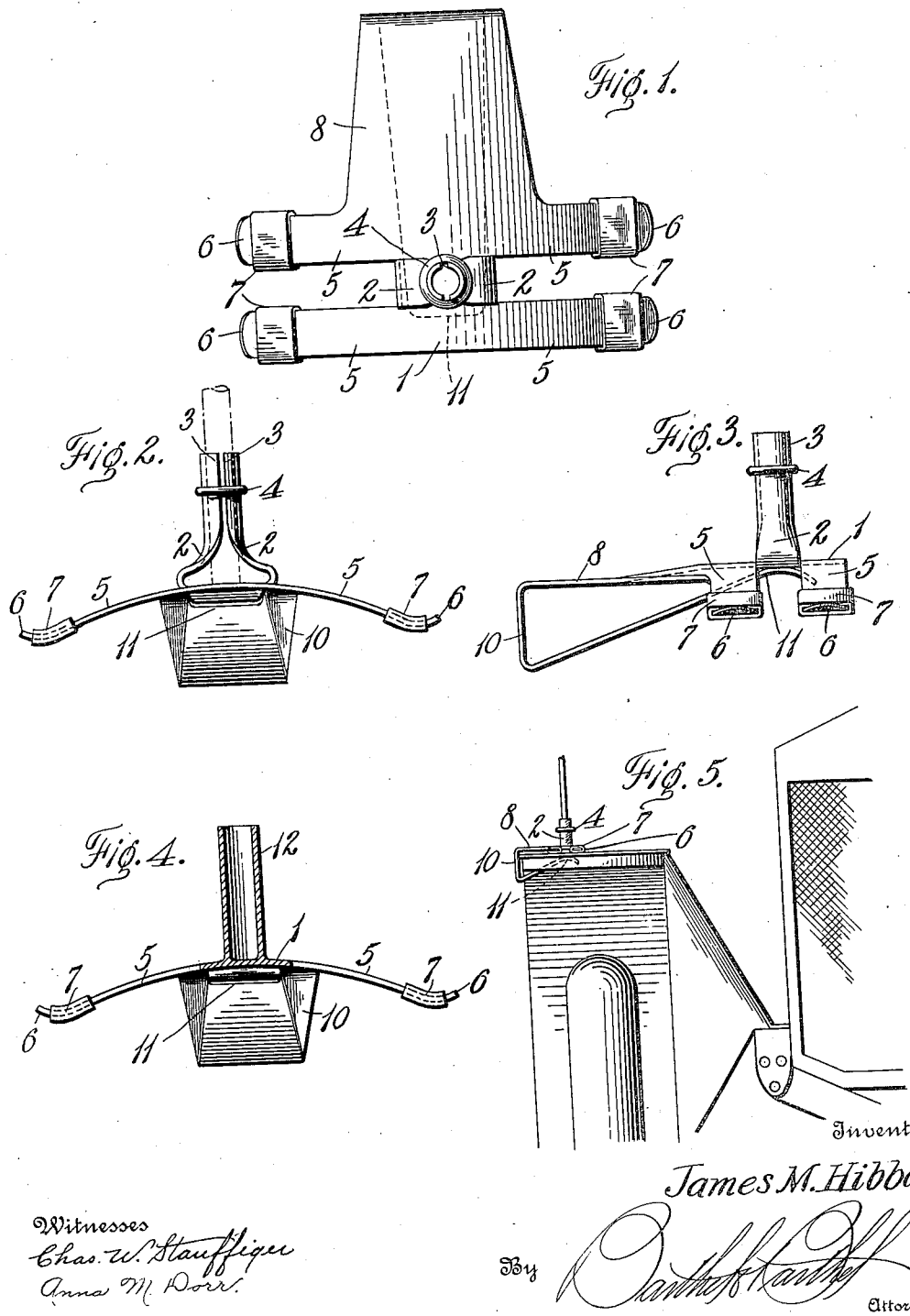

JAMES M. HIBBARD, OF DETROIT, MICHIGAN.

HOLDER FOR FLAGSTAFFS, &c.

1,065,685.

Specification of Letters Patent. Patented June 24, 1913.

Application filed July 22, 1912. Serial No. 710,750.

*To all whom it may concern:*

Be it known that I, JAMES M. HIBBARD, a citizen of the United States of America, residing at Detroit, in the county of Wayne and State of Michigan, have invented certain new and useful Improvements in Holders for Flagstaffs, &c., of which the following is a specification, reference being had therein to the accompanying drawings.

This invention relates to a holder for flag poles or the like arranged to be detachably secured on an automobile fender or in like position and for use in securing decorative devices in place.

The object of the invention is to provide a holder for this purpose which will not chatter or vibrate, which does not readily become loose and which is constructed of a single piece of metal in such manner that it cannot become deformed in use.

The invention consists in the matters hereinafter set forth, and more particularly pointed out in the appended claims.

In the drawings, Figure 1 is a plan view of a holder that embodies features of the invention; Fig. 2 is a view in front elevation thereof; Fig. 3 is a view in side elevation thereof; Fig. 4 is a view, partially in rear elevation and partially in section of a modification of the device; and Fig. 5 is a view showing the device attached to the fender of an automobile.

As herein shown in preferred form, a slightly crowned sheet metal plate 1 has a pair of oppositely disposed strips 2 cut out and unbent near its center, the upper portions of the strips being concaved transversely with their mating margins 3 in substantially parallel relation to form an upright tubular socket that may be closed to greater or less extent, if preferred, by a sliding clamping ring 4. The outer end portions 5 of the plate on either side of the slots left by the upturned arms 2, have their outer extremities 6 slightly up-bent as indicated, and, preferably, are provided with encircling bands 7 of rubber or other like resilient material. A tang 8 extends rearwardly from the plate 1 transversely to the arms 5 with a shank 10 bent downwardly therefrom at substantially right angles, the end portion of the shank being inturned and converging toward the plate against the under side of which an outwardly curved portion 11 bears.

In use the portion 11 forms the extremities of the arms 5 oppositely disposed bearing points which embrace the opposite sides of a fender or the like with yielding spring pressure sufficient to hold the device securely in position without possibility of chattering or vibrating.

The device is not liable to displacement or deformation and is simple to make and efficient in operation.

In the modification shown in Fig. 4, the strips 2 are replaced by a tubular member 12 that is brazed or otherwise suitably secured in position on the plate.

Obviously changes in the details of construction may be made without departing from the spirit of the invention and I do not care to limit myself to any particular form or arrangement of parts.

What I claim is:—

1. A holder for the purposes specified comprising a resilient crowned plate provided with oppositely disposed pairs of arms adapted to bear at their end portions only on a supporting member, and with an in-bent tang transverse to the arms adapted to coact with the latter to yieldingly embrace such support, and a socket member extending from the crest of the plate.

2. A holder for the purposes specified comprising a resilient crowned plate, oppositely disposed pairs of arms thereon adapted to bear at their ends only on a supporting member, a tang from the plate transverse to the arms and bent transversely at substantially right angles and extended convergent to the underside of the plate, and a socket member extending from the crest of the plate.

3. A holder for the purposes specified comprising a resilient crowned plate with a pair of oppositely disposed strips struck up therefrom and transversely concaved to form mating sections, of a tubular socket extending from the crest of the plate, and with a tang that extends from the plate transversely to the arms formed by the turning up of the strips, the tang being downturned and inbent to coact with the arms as holding members.

In testimony whereof I affix my signature in presence of two witnesses.

JAMES M. HIBBARD.

Witnesses:
OTTO F. BARTHEL,
C. R. STICKNEY.